United States Patent
Lin et al.

(12)

(10) Patent No.: US 12,504,579 B2
(45) Date of Patent: Dec. 23, 2025

(54) WAVELENGTH TUNING IN SILICON PHOTONICS

(71) Applicant: Taiwan Semiconductor Manufacturing Company, Ltd., Hsin-Chu (TW)

(72) Inventors: Beih-Tzun Lin, Hsinchu (TW); Chi-Yuan Shih, Hsinchu (TW); Feng Yuan, Hsinchu (TW); Shih-Fen Huang, Zhubei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 301 days.

(21) Appl. No.: 18/298,574

(22) Filed: Apr. 11, 2023

(65) Prior Publication Data

US 2024/0069275 A1    Feb. 29, 2024

Related U.S. Application Data

(60) Provisional application No. 63/373,972, filed on Aug. 30, 2022.

(51) Int. Cl.
*G02B 6/12* (2006.01)
*G02B 6/13* (2006.01)
*G02B 6/293* (2006.01)

(52) U.S. Cl.
CPC ..... *G02B 6/12002* (2013.01); *G02B 6/12004* (2013.01); *G02B 6/13* (2013.01); *G02B 6/29335* (2013.01); *G02B 2006/12061* (2013.01)

(58) Field of Classification Search
CPC .................................................. G02B 6/29335
See application file for complete search history.

(56) References Cited

U.S. PATENT DOCUMENTS

| | | | |
|---|---|---|---|
| 6,823,094 B2 * | 11/2004 | Goh | G02F 1/2255 385/41 |
| 9,366,822 B1 * | 6/2016 | Lentine | G02F 1/011 |
| 9,551,832 B1 * | 1/2017 | Bovington | G02B 6/12007 |
| 9,983,420 B2 * | 5/2018 | Amberg | G02F 1/0147 |
| 10,466,433 B2 | 11/2019 | Epitaux et al. | |

(Continued)

FOREIGN PATENT DOCUMENTS

| | | |
|---|---|---|
| CN | 101006373 A | 7/2007 |
| CN | 114200581 A | 3/2022 |

(Continued)

*Primary Examiner* — Charlie Y Peng
(74) *Attorney, Agent, or Firm* — HAYNES AND BOONE, LLP (57) ABSTRACT

A method of wavelength tuning in a silicon photonics circuit includes receiving a bus waveguide, a ring resonator optically coupled to the bus waveguide, and a dielectric layer over the bus waveguide and over the ring resonator. The method further includes performing a first heat process at a first temperature to heat up the dielectric layer, where the first heat process shifts an initial resonance wavelength of the ring resonator to a first resonance wavelength shorter than the initial resonance wavelength. The first heat process permanently shifts the initial resonance wavelength to the first resonance wavelength, the first resonance wavelength being a wavelength when no heat is being applied to the ring resonator.

20 Claims, 7 Drawing Sheets

(56) References Cited

U.S. PATENT DOCUMENTS

| | | |
|---|---|---|
| 11,175,451 B2 | 11/2021 | Jayatilleka et al. |
| 2014/0263948 A1* | 9/2014 | Lee .................... G01N 21/7746 250/206 |
| 2017/0229837 A1* | 8/2017 | Cao ....................... G02F 1/0121 |
| 2019/0293872 A1* | 9/2019 | Nebendahl .............. G02F 1/313 |

FOREIGN PATENT DOCUMENTS

| | | |
|---|---|---|
| JP | 6589273 B2 | 10/2019 |
| TW | 202229949 A | 8/2022 |
| TW | 202232201 A | 8/2022 |

\* cited by examiner

WAVELENGTH TUNING IN SILICON PHOTONICS

PRIORITY DATA

This application claims priority to U.S. Provisional Patent Application Ser. No. 63/373,972 filed Aug. 30, 2022, the entire disclosure of which is incorporated herein by reference.

BACKGROUND

Silicon photonics has emerged as a promising technology to complement silicon electronics. Since silicon photonics is compatible with the fabrication of complementary metal oxide semiconductor (CMOS) integrated circuits (ICs), this allows for easy integration with existing foundry infrastructures. Instead of using copper wires to carry electrical signals, silicon photonics use silicon waveguides as interconnects to carry optical signals. As compared to transmission of data by traditional copper wires, silicon photonics may offer reduced power consumption, higher efficiency, lower latency, and higher bandwidth. As such, photonic circuits are poised to address the ever-growing high-bandwidth needs of servers and data centers of tomorrow, where the high-volume processing of silicon platforms (such as multi-gate semiconductor devices) and the low cost of traditional optical communications may redefine the constraints of high-performance interconnects.

Because silicon has a high thermo-electric coefficient, it can be extremely sensitive to temperature variations. Taking advantage of this, thermo-optical tuning is sometimes performed in silicon photonic ICs to provide thermal stabilization and to allow for wavelength tuning in the control of circuit performance. This may be done through micro-ring resonators (MRRs) or other devices sensitive to the effective refractive index. However, applying too much heat for tuning may cause thermal waste and decrease power efficiency, hindering the desired performance of the silicon photonic circuit. Therefore, while existing wavelength tuning in silicon photonics are generally adequate for their intended purposes, they are not satisfactory in all aspects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion. It is also emphasized that the drawings appended illustrate only typical embodiments of this invention and are therefore not to be considered limiting in scope, for the invention may apply equally well to other embodiments.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.25 nm to 5.75 nm where manufacturing tolerances associated with depositing the material layer are known to be +/−15% by one of ordinary skill in the art. Still further, the present disclosure may repeat reference numerals and/or letters in the various examples. This repetition is for the purpose of simplicity and clarity and does not in itself dictate a relationship between the various embodiments and/or configurations discussed.

The present disclosure relates to wavelength tuning in silicon photonics circuits. To enhance the performance of silicon photonics devices, the operating wavelength should be aligned with the resonance wavelength. This may be done through resonators or modulators, which are optically coupled to the waveguides that transport light. The resonators and modulators may include micro-rings, grating couplers, phase shifters, directional couplers, y-junction, and MMI devices. The wavelength may be shifted by applying heat to the resonators/modulators, causing a shift to a longer wavelength (also known as red shift). However, heating the resonators/modulators generally does not cause a shift to a shorter wavelength (also known as blue shift). Thus, to cover the necessary tuning range, there is potential need to shift wavelength by close to 1 whole free spectral range (FSR) for proper tuning. Doing so may introduce undesirable heat power consumption to stay within design considerations, requiring for high heat power to match laser wavelengths.

The present disclosure provides solutions to the issue of power consumption in silicon photonics. Specifically, the present disclosure allows for wavelength tuning in the shorter wavelength direction (blue shift), thereby minimizing thermal energy waste when tuning wavelength in the longer wavelength direction (red shift) during circuit operation. This may be realized by introducing additional stress to the dielectric material surrounding the silicon photonic device. For example, a heating process may be performed to a dielectric film surrounding a silicon waveguide, and the heat may give rise to a property change in the dielectric film, causing the dielectric film to exert a stress on the silicon waveguide. It is observed that the stress can alter wavelength in the silicon photonic device in a controlled manner, allowing for blue shift to tune resonance wavelength.

Figure 1:
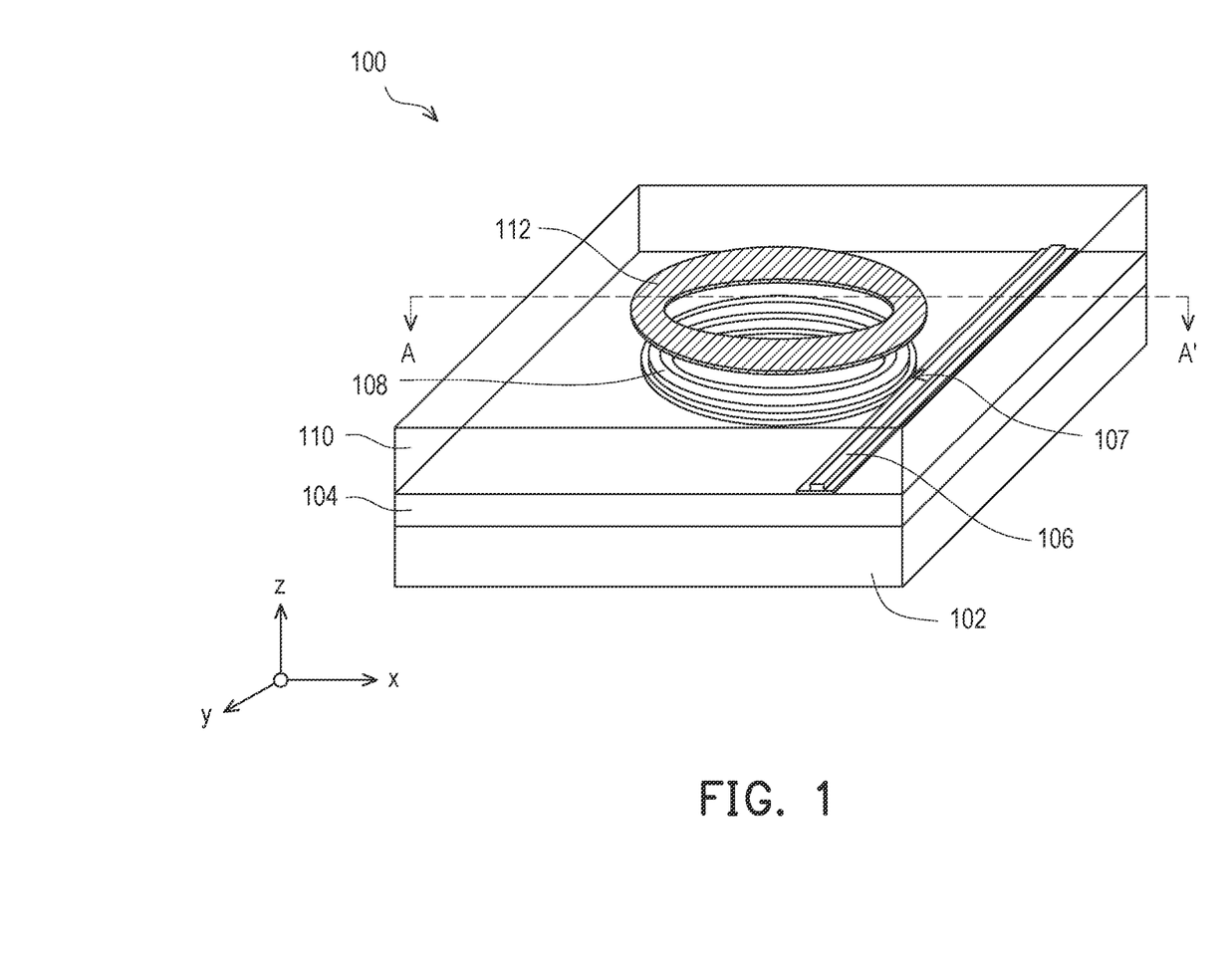
FIG. 1 illustrates a three-dimensional view of a silicon photonics device according to an embodiment of the present disclosure.

FIG. 1 illustrates a three-dimensional view of a silicon photonics device 100 according to an embodiment of the present disclosure. The silicon photonics device 100 includes a silicon substrate 102 and a silicon waveguide 106 disposed over the silicon substrate 102. In some embodiments, as shown, the silicon waveguide 106 is separated from the silicon substrate 102 by a buried oxide layer 104. The silicon waveguide 106 may be a bus waveguide having an input port and an output port. The input port may receive an optical signal lasing at a specific wavelength, and the output port may be a throughput port at an opposite end of the input port. The silicon waveguide 106 is optically coupled to a resonator or modulator, such as a ring resonator (or micro-ring resonator) 108 for wavelength tuning. This coupling may also be known as evanescent coupling, which occurs at a coupling region 107. The coupling region 107 is where light travels from the silicon waveguide 106 into the ring resonator 108. It is also where the light travels back into the silicon waveguide 106 after the light travels around the ring resonator 108. This coupling occurs at resonance. A ring resonator is at resonance when an optical wavelength (target wavelength) at the input port matches the resonant wavelength at the ring resonator. As such, the ring resonator could be viewed as a ring-shaped waveguide that an optical signal travels into when resonance occurs.

Still referring to FIG. 1, the ring resonator 108 is disposed adjacent to the silicon waveguide 106. The ring resonator 108 is made of silicon and is also disposed over the silicon substrate 102. In some embodiments, the waveguide 106 also includes silicon nitride. In an embodiment, as shown, the ring resonator 108 is disposed over the buried oxide layer 104. A dielectric layer (or film) 110 is disposed over the silicon waveguide 106 and the ring resonator 108. A heater 112 is disposed over the ring resonator 108 and configured to heat up the ring resonator 108 for resonance tuning. The heater 112 may be a ring-shaped heater but is not limited thereto. The heater 112 is made of a conductive material, which may include tungsten. The heater 112 may be embedded in the dielectric layer 110. The dielectric layer 110 may be of the same material as the buried oxide layer 104, which in an embodiment includes silicon oxide. In some embodiments, the dielectric layer 110 is of a different material as the buried oxide layer 104. In these embodiments, the dielectric layer may include a metal oxide, LK oxide, silicon nitride, or silicon oxynitride.

Figure 2:
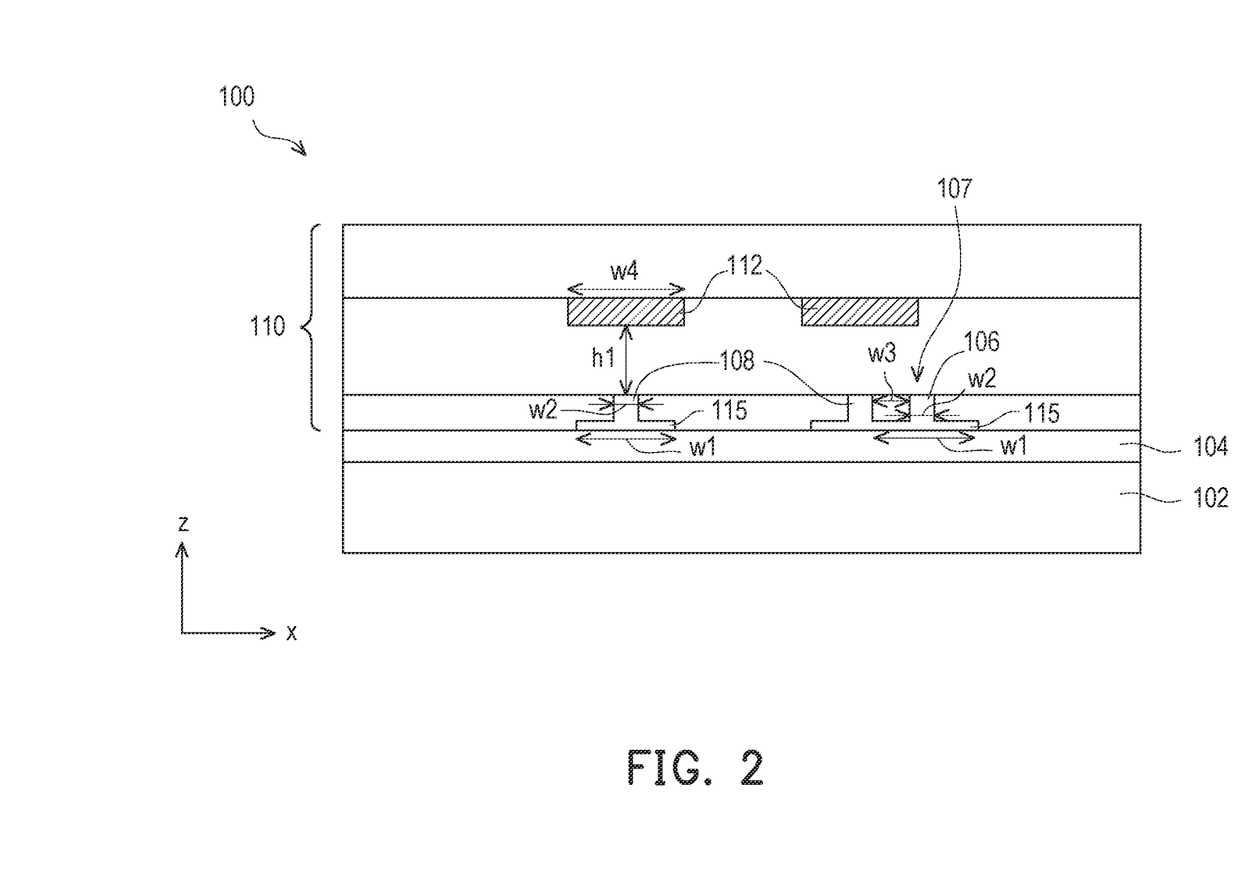
FIG. 2 illustrates a cross-sectional view of the silicon photonics device of FIG. 1 cut along the lines A-A'.

FIG. 2 illustrates a cross-sectional view of the silicon photonics device 100 of FIG. 1 cut along the lines A-A'. As shown, the silicon waveguide 106 and ring resonator 108 each protrudes above a silicon base (or rib) 115 along the z direction. The silicon base 115 is disposed over the buried oxide layer 104 and extends along the x direction. In an embodiment, the ratio of a width w1 of the silicon base to a width w2 of the silicon waveguide 106 (or ring resonator 108) is greater than 10. Referring to the coupling region 107 between the silicon waveguide 106 and ring resonator 108, there is a distance w3 between the silicon waveguide 106 and the ring resonator 108, which each protrudes above their respective silicon bases 115. The width w2 of the waveguide 106 affects the optical mode of the silicon photonics device 100 (e.g., for single mode or multimode operations). The distance w3 between the waveguide 106 and the ring resonator 108 affects the coupling performance. In an embodiment, the ratio of the width w2 to the distance w3 is in a range between 1.8 to 3.7 to ensure proper coupling and lasing for subsequent resonance wavelength tuning.

A dielectric layer 110 is disposed over the buried oxide layer 104, the silicon base 115, the ring resonator 108, and the silicon waveguide 106. The dielectric layer 110 surrounds the ring resonator 108 and silicon waveguide 106. The ring resonator 108 and silicon waveguide 106 are sandwiched between the buried oxide layer 104 and the dielectric layer 110. A heater 112 is spaced away from a top surface of the ring resonator 108 at a distance h1. The distance h1 corresponds to a dielectric spacing of the dielectric layer 110 between the ring resonator 108 and the heater 112. In some embodiments, the heater 112 may be embedded in the dielectric layer 110. The dielectric layer 110 may include multiple layers formed in separate processes.

Still referring to FIG. 2, the distance h1 is designed to be in a range between 500 nm to 1000 nm. The distance h1 should not be too close or too far from the ring resonator 108. If the distance h1 is too close (e.g., less than 500 nm), the optical mode of the ring resonator may be adversely affected, such as from undesired coupling between the heater 112 and the ring resonator. Further, if h1 is too close, there may be potential heat damage to the ring resonator when the temperature gets too hot. On the other hand, if the distance h1 is too far (e.g., greater than 1000 nm), there may not be adequate tuning of the ring resonator since most of the heat would be absorbed by the dielectric layer 110. Further, the distance h1 relates to the degree in which the effective refractive index of the dielectric layer 110 can be changed. As contemplated by the present disclosure, intrinsic properties of the dielectric layer 110 (or portions thereof) needs to be changed in order to shift resonance wavelengths in the shorter direction. As such, there should be adequate amount of dielectric material surrounding the ring resonator 108 and waveguide 106 to effectuate the wavelength shift. However, too much dielectric material is also not needed. This is because portions of the dielectric material that are too far away from the ring resonator 108 and waveguide 106 will have reduced effect on wavelength shift.

Still referring to FIG. 2, in an embodiment, the ratio of a height in the z direction of the silicon waveguide 106 and ring resonator 108 (not shown) to a height in the z direction of the silicon base 115 (not shown) is in a range between 3.5 to 4.5. And in an embodiment, a width w4 of the heater is greater than the width w1 of the silicon base 115. This is to allow for better heat coverage of the silicon material in the silicon base 115 and the ring resonator 108, allowing for more pronounced effect of tuning wavelength.

Figure 3:
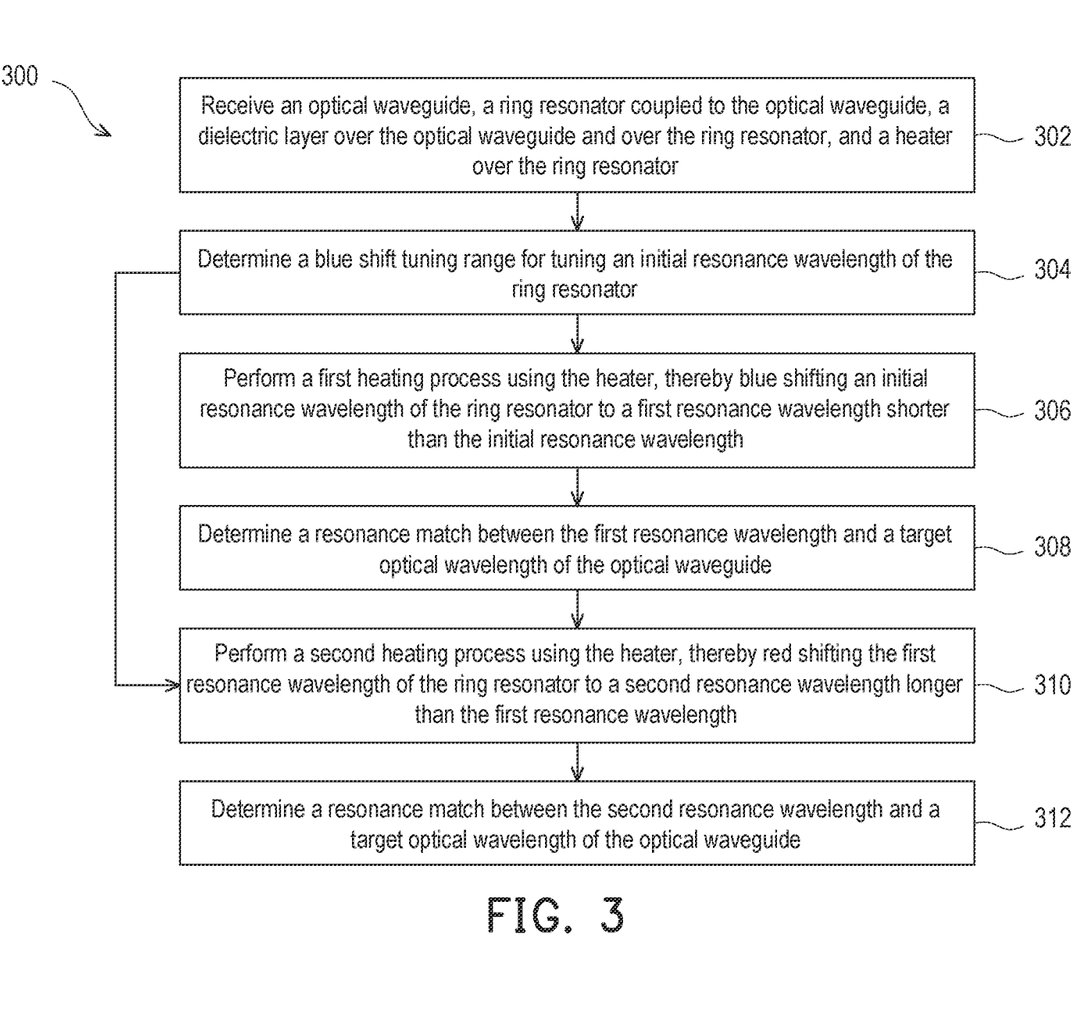
FIG. 3 illustrates a flow chart of a method to tune resonance wavelength in a silicon photonics circuit according to an embodiment of the present disclosure.

FIG. 3 illustrates a flow chart of a method 300 to tune resonance wavelength in a silicon photonics circuit according to an embodiment of the present disclosure. The method 300 is described below, with additional details described with respect to FIGS. 4-7B. The method 300 contemplates different scenarios of resonance wavelength tuning. This includes shifting resonance wavelength shorter (blue shifting), longer (red shifting), or both. In a first scenario, after determining a blue shift tuning range, blue shifting is not performed, and only red shifting is performed. In this first scenario, the red shifting achieves resonance. In a second scenario, after determining a blue shift tuning range, blue shifting is performed, and red shifting is not performed. In this second scenario, the blue shifting achieves resonance. In a third scenario, after determining a blue shift tuning range, blue shifting is performed, and red shifting is performed thereafter. In this third scenario, the red shifting achieves resonance.

At operation 302, the method receives or is provided with a silicon photonics device 100 having an optical waveguide 106, a ring resonator 108 coupled to the optical waveguide 106, a dielectric layer 110 over the optical waveguide 106 and over the ring resonator 108, and a heater 112 over the ring resonator 108. These structural configurations have been described with respect to FIGS. 1-2 and will not be repeated here for the sake of brevity.

At operation 304, the method 300 determines a blue shift tuning range for tuning an initial resonance wavelength of the ring resonator. This includes determining the initial resonance wavelength of the ring resonator and determining how far it can be shifted in the shorter wavelength direction. Such a blue shift will cause the initial resonance wavelength to shift to a first resonance wavelength shorter than the initial resonance wavelength.

In some cases, it is determined that the max amount of blue shift will not be enough to reach the target wavelength. This means that the blue shift tuning range is insufficient to achieve resonance match between the initial resonance wavelength and the target optical wavelength. For these cases, the method 300 skips operations 306 and 308 and continues to operation 310. This is explained in more detail in an embodiment of FIG. 6 below.

In other cases, it is determined that the max amount of blue shift will be enough to reach the target wavelength. This means that the blue shift tuning range is sufficient to achieve resonance match between the initial resonance wavelength and the target optical wavelength. This could also mean that the blue shift tuning range is sufficient to shift beyond the target wavelength. For these cases, blue shift tuning may be performed at operation 306. However, in further embodiments, even if there is sufficient blue shift tuning range to achieve resonance, operations 306 and 308 are skipped, and only red shifting is performed. This is explained in more detail in an embodiment of FIG. 6 below.

At operation 306, the method 300 performs a first heating process using the heater 112, thereby blue shifting an initial resonance wavelength of the ring resonator to a first resonance wavelength shorter than the initial resonance wavelength. At operation 308, the method 300 determines a resonance match between the first resonance wavelength and a target optical wavelength of the optical waveguide. In an embodiment (e.g., FIG. 5), if there is a resonance match, the method 300 ends and operations 310 and 312 are not performed. In another embodiment (e.g., FIG. 6), if there is not a resonance match, and the tuning shifts the initial resonance wavelength past the target wavelength, the method 300 continues to operation 310.

At operation 310, the method 300 performs a second heating process using the heater 112, thereby red shifting the first resonance wavelength of the ring resonator to a second resonance wavelength longer than the first resonance wavelength. As explained in more detail with respect to FIGS. 5-6 below, the first heating process and the second heating process are different. For example, the temperature or voltage ranges for the two heating processes are different, and the lengths of time in applying the heat are different. Further, the temperature applied in the first heating process may affect the maximum temperature that can be applied in the second heating process.

In cases where operations 306 and 308 are skipped, the method 300 performs the red shift heating process (i.e., the second heating process) without performing the blue shift heating process (i.e., the first heating process). In these cases, the method 300 at operation 310 red shifts the initial resonance wavelength to the second resonance wavelength longer than the initial resonance wavelength.

At operation 312, the method 300 determines a resonance match between the second resonance wavelength and the target optical wavelength of the optical waveguide. Additional operations are contemplated by the present disclosure. These operations can be provided before, during, and after the different operations of method 300. Further, some of the operations described can be moved, replaced, or eliminated for additional embodiments of method 300.

Figure 4:
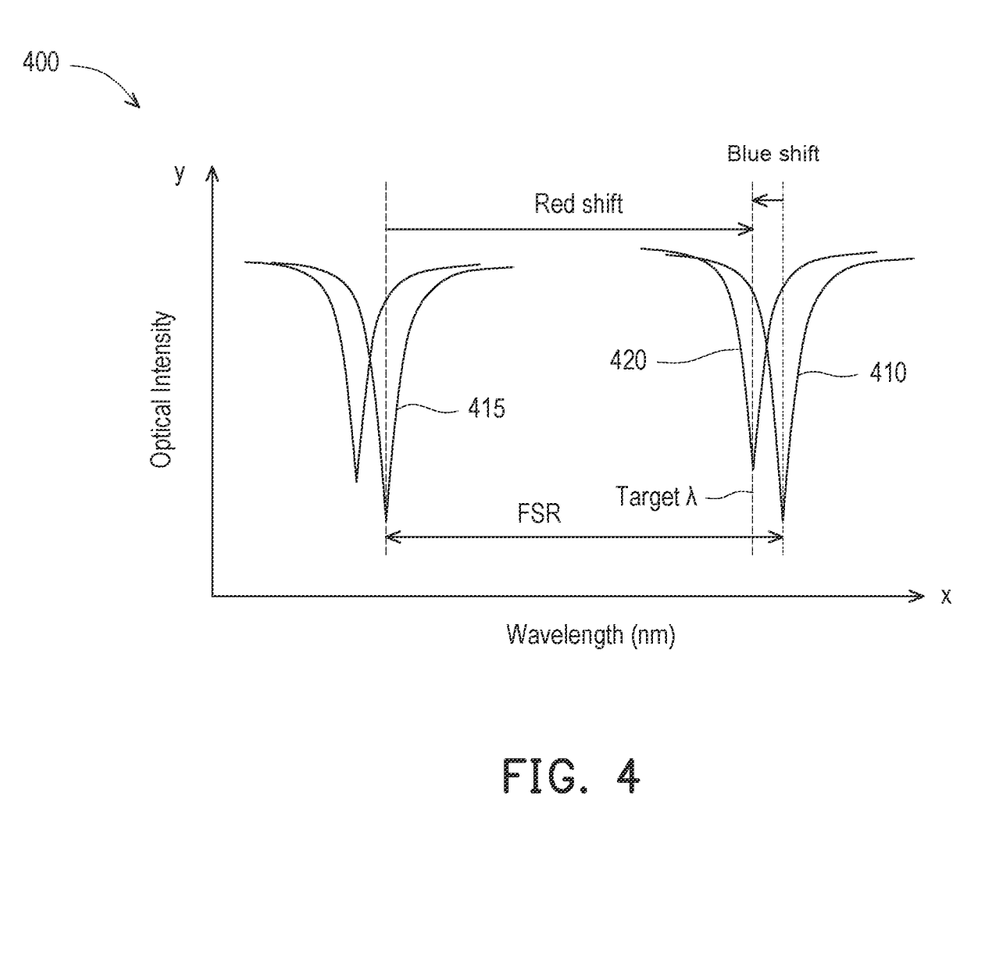
FIG. 4 illustrates a diagram of resonance wavelength tuning according to an embodiment of the present disclosure.

FIG. 4 illustrates a diagram 400 of resonance wavelength tuning according to an embodiment of the present disclosure. As described above, the goal of resonance wavelength tuning is to align a target wavelength ($\lambda$) (e.g., an operating laser wavelength) with a resonance wavelength ($\lambda$) of a resonator (or modulator) for enhanced circuit performance such as enhanced optical intensity. This may be done by shifting the resonance wavelength to the desired target wavelength. The diagram 400 shows a spectral response of a resonator, for example a ring resonator 108. As shown, an initial resonance wavelength 410 is mismatched with a target wavelength (target $\lambda$). Note that there is also another initial resonance wavelength 415, which is one free spectral range (FSR) away from the initial resonance wavelength 410. In the diagram 400, the initial resonance wavelength 410 is at a longer wavelength than the target wavelength. In this instance, there may be two ways to achieve resonance match, either by a blue shift or a red shift. Blue shift may be achieved by directly shifting the initial resonance wavelength 410. This may be achieved by the first heating process at operation 306, which shifts the initial resonance wavelength 410 to a shorter wavelength, as will be explained with reference to FIG. 5 below. Red shift may be achieved by shifting from the initial resonance wavelength 415, one that is shorter than the target wavelength and one FSR away from the initial resonance wavelength 410. This may be achieved by the second heating process at operation 310, which shifts the resonance wavelength 415 to a longer wavelength. The second heating process is explained with reference to FIG. 6 below. In either case, a final resonance wavelength 420 is achieved to match the target wavelength.

Still referring to FIG. 4, and in reference to operation 304, the method 300 determines a blue shift tuning range for tuning the initial resonance wavelength 410 of the ring resonator 108. In cases where the blue shift tuning range is insufficient to shift the initial resonance wavelength 410 to match the target wavelength, blue shift tuning is not performed. This is because such a blue shift will only increase the amount of red shift required in a subsequent operation (i.e., the initial resonance wavelength 415 is moved further away from the target λ due to insufficient blue shift). The additional red shifting is undesirable because it would require additional heat to be applied to the ring resonator 108 during circuit operation. Therefore, in such cases, only red shift tuning is performed and the method 300 skips to operation 310. In cases where blue shift tuning is sufficient to shift the resonance wavelength 410 to match the target wavelength, or to a wavelength shorter than the target wavelength, blue shift tuning may be performed. For these cases, the method 300 continues to operation 306. In further embodiments, an analysis is performed to see if blue shift tuning should be performed even when the blue shift tuning range is sufficient. For example, the analysis factors include the success rate of blue shift tuning, the permanent effects on the dielectric material after blue shift, and the amount of red shift needed. Therefore, in certain cases (e.g., not a lot of red shift needed, too much stress applied to device, etc.), only red shift tuning is performed even though blue shift tuning may also be performed to achieve resonance.

Figure 5:
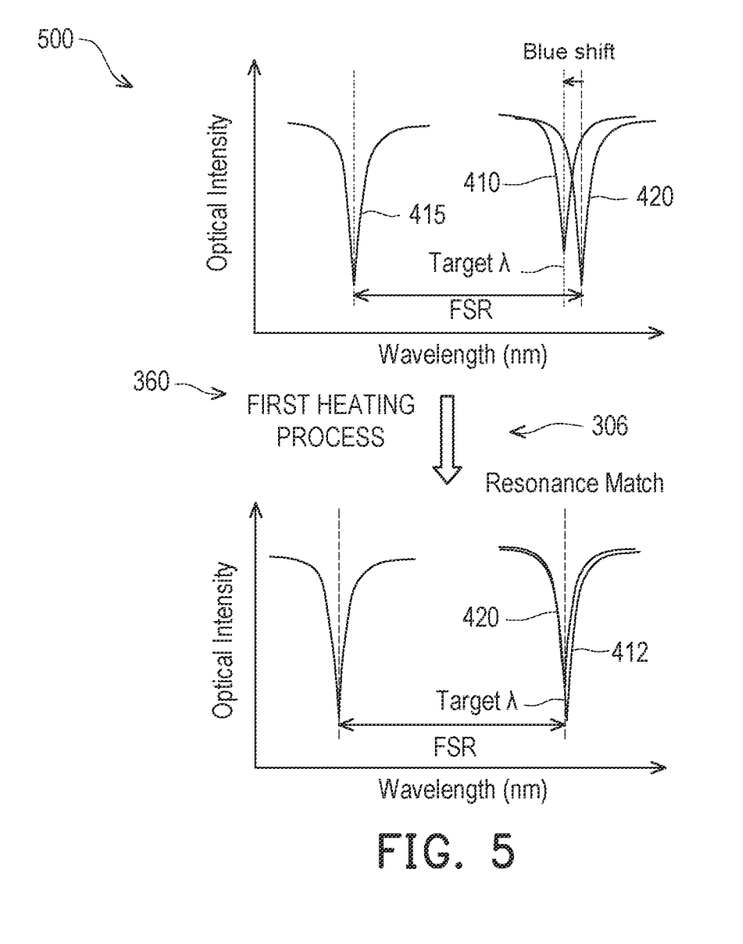
FIG. 5 illustrates a diagrammatic flow for tuning resonance wavelength according to an embodiment of the present disclosure.

FIG. 5 illustrates a diagrammatic flow 500 for tuning resonance wavelength according to an embodiment of the present disclosure. In this embodiment, the operation 304 of method 300 has determined that there is sufficient blue shift tuning range to shift the initial resonance wavelength 410 to match the target wavelength, or to a wavelength shorter than the target wavelength. As such, the method 300 may continue onto operation 306, where a first heating process 360 is performed. In this embodiment, the first heating process 360 is performed by the heater 112, which also performs the second heating process 380 as explained below with reference to FIG. 6. In another embodiment, the first heating process 360 may be performed by a separate heater (not shown) from the heater 112. For example, this separate heater targets heating the dielectric materials surrounding the ring resonator 108 and the coupling region 107. But this separate heater is not concerned with heating up the ring resonator 108 itself (as long as it does not damage it). This separate heater is not turned on during circuit operation. During circuit operation, only the heater 112 is turned on for red shift tuning.

The first heating process 360 heats up the temperature of the dielectric layer 110 and the ring resonator 108. The heat may be produced by applying a voltage or a set of voltages to the heater 112. To achieve blue shift, the voltage applied must heat up the dielectric layer 110 (or a portion thereof) to a temperature that permanently changes an effective refractive index of the dielectric layer 110 (or a portion thereof). In the context of the present disclosure, permanently changing or producing a permanent change, means that that when the applied heat (or voltage) is taken away, the effective refractive index remains the same due to a lasting change in film stress. This does not necessarily mean the effective refractive index of the dielectric layer 110 can never be changed again. For example, after a first heating process 360, another first heating process 360 may be applied again that further permanently changes the effective refractive index of the dielectric layer 110 (i.e., stressing the film even further than before). Performing additional first heating processes 110 can further change the film stress of the dielectric layer 110 in one direction (until a breakdown point), but the stress cannot be undone in the other direction. In this sense, the permanent change is in fact permanently irreversible in the other direction. In an embodiment, the first heating process 360 is configured to change the intrinsic dielectric properties of the dielectric layer 110 by introducing a compressive stress in the dielectric layer 110. The compressive stress leads to a decrease in effective refractive index in the dielectric layer 110, thereby blue-shifting the resonance wavelength of the ring resonator 108. The first heating process 360 is different from the second heating process 380 (explained in more detail with reference to FIG. 6). For example, the first heating process 360 produces a permanent change to the effective refractive index of the dielectric layer 110 (explained above), but a second heating process 380 performed thereafter does not (i.e., the effective refractive index change in the second heating process 380 is only a temporary change).

In the first heating process 360, depending on the film deposition condition or other factors affecting the dielectric properties of the dielectric layer 110, a minimum threshold voltage or heat stress must be met before blue shift begins. In other words, a threshold amount of compressive stress must be applied before an effective refractive index in the dielectric layer 110 is changed. For example, the minimum threshold voltage may be in a range between 1.5 to 2 volts. And the minimum threshold temperature may be in a range between 400 to 500 degrees Celsius. Note that this minimum threshold temperature range is applied at the heater 112, which may result in a temperature range between 150 to 200 degrees Celsius at the ring resonator 108 and silicon waveguide 106. As such, the temperature at the dielectric layer 110 (e.g., at FIG. 2 spacing h1) may be at an average temperature between 200 to 400 degrees Celsius. As voltage or temperature is increased above the minimum threshold, additional amounts of blue shift can be achieved before a device breakdown point (maximum threshold) is reached. In some embodiments, the voltage breakdown point may be in a range between 3.5 to 5 volts. And the temperature breakdown point may be in a range between 900 to 1000 degrees Celsius. Note that this temperature breakdown point is a temperature applied at the heater 112, which may cause device breakdown at the ring resonator 108 and silicon waveguide 106 at a temperature between 400-500 degrees Celsius. Note that the minimum threshold voltage or heat stress is only a starting point and does not necessarily reflect the final applied voltage to achieve the desired blue shift.

Because of the risk of breaking down the device 100 by applying too high a voltage or temperature, the first heating process 360 should be applied starting at the minimum threshold voltage or heat stress, and slowly increase until the desired blue shift is achieved. Since blue shift is achieved by changing the intrinsic dielectric properties of the dielectric materials near the ring resonator 108 and waveguide 106, the blue shift invokes a permanent change to the intrinsic properties of the device 100. As such, another reason that the applied voltage or heat should start at the minimum threshold is because the shift is irreversible in one direction (i.e., cannot be shifted back unless dielectric properties are reversed), and any overshoot can only be corrected by a later red shift. In other words, after the first heating process 360, the initial resonance wavelength has been reset to a new resonance wavelength 412 (i.e., a first resonance wavelength or an adjusted resonance wavelength). This is measured when no voltage or heat stress is applied through the heater 112. Therefore, the highest temperature or voltage applied in the first heating process 360 determines the new resonance wavelength 412. Any lower voltage or temperature applied subsequently will not produce additional blue shift. For example, if during the first heating process 360, a set of voltages ranging from 1.5 volts to 3 volts was applied, the voltage at 3 volts sets the blue shift amount. If a voltage of 2.5 volts is applied later, the blue shift amount remains the same and no additional blue shift occurs.

In some embodiments, during the first heating process 360, each time a voltage or heat stress is applied, it is applied for less than 2 minutes, for example 30 seconds. This is because prolonged heat may increase the risk of breaking down the device 100. Another reason is that the applied heat stress does not need to be maintained continuously. After the desired blue shift is achieved, the new resonance wavelength 412 is set even when temperature or voltage returns to 0.

Still referring to the first heating process 360, the desired blue shift is achieved by a blueshift voltage (i.e., highest voltage applied during the first heating process 360). The blueshift voltage is in a range between a minimum threshold voltage and a voltage at the device breakdown point. Specifically, the blueshift voltage is greater than the minimum threshold voltage but lower than the device breakdown voltage.

The blueshift voltage is greater than the minimum threshold voltage because the minimum threshold voltage only sets a starting point when blue shift begins; it does not actually determine the desired blue shift needed. As such, if the blueshift voltage is the same as the minimum threshold voltage, no blue shift (or an inconsequential amount of blue shift) is achieved. An inconsequential amount of blue shift is one less than 0.05 nm. Therefore, a slow step-up of voltages should be applied, monitoring the blue shift amount after each step-up until a target blue shift is reached at the blueshift voltage greater than the minimum threshold voltage.

The blueshift voltage should also be lower than the device breakdown voltage. Because of the risk of destroying the device 100, there should be a voltage cushion to avoid getting too close to destroying the device 100. Further, in some cases, no more blue shift is observed beyond a certain increased voltage. If so, there is no point in continuing to increase the applied voltage until the device breakdown voltage is reached. Even further, since blue shifting is permanent in one direction, reaching a max blue shift means further blue shifting is no longer possible. But in some cases, the ability to do further blue shifting is desired for later calibrations.

In one embodiment, a silicon photonic device 100 may have a minimum threshold voltage at 1.5 volts and a breakdown voltage at 4 volts. In this case, the blueshift voltage range is between 2 to 3.5 volts. This is because at 1.5 to 2 volts, there is an inconsequential amount of blue shift. But upon reaching 3.5 volts, either no additional blue shift is possible, or going any further will risk device breakdown. As such, the blueshift voltage range is between 2 to 3.5 volts. In other embodiments, the blueshift voltage range is between 2.5 to 4 volts.

Similarly, when applying a heat stress to achieve the desired blue shift, the heat stress is in a range between a minimum threshold temperature and a temperature at the device breakdown point. In one embodiment, this heat stress is in a range between 400 to 450 degrees Celsius. In another embodiment, this heat stress is in a range between 450 to 550 degrees Celsius.

The first heating process 360 is performed before operation of the silicon photonics device 100. That is, the operations 304 and 306 (i.e., determining blue shift tuning range and performing the first heating process 360) is performed before the device 100 is shipped out to customers. For example, operations 304 and 306 may be carried out during a device testing or a quality control phase of device fabrication.

In some embodiments, the first heating process 360 may be performed after circuit operation of the silicon photonics device 100. In further embodiments, the first heating process 360 may be performed multiple times, such as once before device operation and once after device operation. For example, a first heating process 360 is applied during a device testing phase before device operation. And after device operation, an additional first heating process 360 is performed as part of calibrating the device 100 to compensate for any wavelength drift over time. The only limitation on the number of times the first heating process 360 can be performed is whether the effective refractive index of the dielectric layer 110 can be changed any further (i.e., whether additional blue shift is still possible). For example, if the max blue shift tuning range is reached, the first heating process 360 will not be performed again.

Still referring to FIG. 5, after the first heating process 360 is performed, at operation 308, the method 300 determines a resonance match between the adjusted resonance wavelength 412 and the target wavelength. This determination may be done through a feedback iterative process. For example, a determination of match is made every time a voltage is applied during operation 306. As shown, the resonance match occurs when the adjusted resonance wavelength 412 shifts to a final resonance wavelength 420 matching the target wavelength. In this embodiment, once resonance match occurs, the method 300 finishes resonance tuning and does not continue to operation 310. Since blue shift allows a reset of resonance wavelength, heater power otherwise necessary to red shift the resonance wavelength is eliminated during operation of the device 100. This is advantageous since overall power consumption during operation is reduced.

Figure 6:
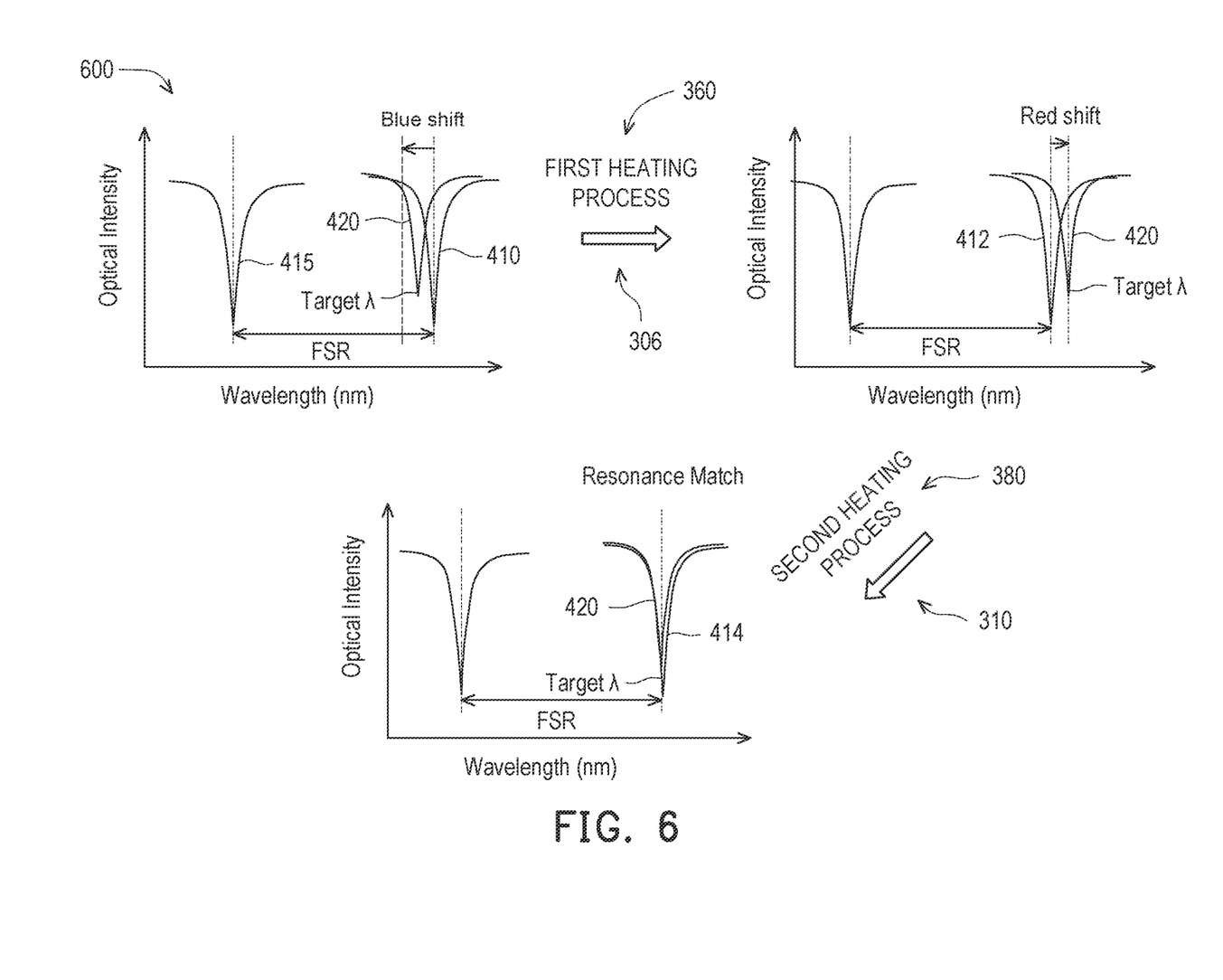
FIG. 6 illustrates a diagrammatic flow for tuning resonance wavelength according to another embodiment of the present disclosure.

FIG. 6 illustrates a diagrammatic flow 600 for tuning resonance wavelength according to another embodiment of the present disclosure. The flow 600 includes a first heating process 360 at operation 306 and a second heating process 380 at operation 310. Similar to the first heating process 360 in FIG. 5, the first heating process 360 in FIG. 6 is performed to cause a blue shift of resonance wavelength. The similarities are not repeated here for the sake of brevity. Different from the first heating process 360 in FIG. 5, the first heating process 360 in FIG. 6 blue shifts the initial resonance wavelength 410 past the target wavelength. As such, the adjusted resonance wavelength 412 is shorter than the target wavelength (instead of matching the target wavelength). In this case, additional voltage or heat is applied even when the adjusted resonance wavelength 412 matches the target wavelength. Preferably, the wavelength offset past the target wavelength is small, for example less than 1 nanometer. One reason to blueshift the initial resonance wavelength 410 past the target wavelength is to allow tuning flexibility in a subsequent second heating process 380. Another reason is to address any blue shift tuning error, which would result in requiring more heat during circuit operation for red shift tuning. For example, if it turns out that the blue shift does not actually shift enough wavelength, extra heat is required to shift the wavelength during red shift tuning, which is undesirable. Incorporating an extra blue shift cushion alleviates this risk. The second heating process 380 red shifts a resonance wavelength to a longer wavelength. As shown, the second heating process 380 may be performed after the first heating process 360.

Still referring to FIG. 6, after the first heating process 360, the initial resonance wavelength 410 is shifted to an adjusted resonance wavelength 412 shorter than the target wavelength. Therefore, additional tuning may be necessary to shift the adjusted resonance wavelength 412 to a final resonance wavelength 420 that matches the target wavelength. In this case, the method 300 at operation 308 still determines when a resonance match occurs. But the operation 308 allows the initial resonance wavelength 410 to blue shift past the target wavelength to an adjusted resonance wavelength 412. At operation 310, the method 300 performs a second heat process using the heater 112. This is to red shift the adjusted resonance wavelength 412 to a second adjusted resonance wavelength 414.

The second heating process 380 heats up the temperature of the dielectric layer 110 and the ring resonator 108. The heat may be produced by applying another voltage or set of voltages to the heater 112. However, red shift is primarily achieved by applying heat to the ring resonator 108, without permanently changing the effective refractive index of the dielectric layer 110. In other words, the change to the effective refractive index, if any, is temporary, and the changes should reverse once the applied heat is taken away. Therefore, the heat applied should not further change the intrinsic dielectric properties of the dielectric layer 110, causing unintended blue shift. As such, a highest heat stress applied during the second heating process 380 should be lower than a highest heat stress applied during the first heating process 360. For example, if the intended blue shift was achieved at a blueshift voltage of 2.5 volts during the first heating process 360, the voltage range applied during the second heating process 380 must be lower than 2.5 volts. In some embodiments, the max voltage applied in the second heating process 380 is less than the max voltage applied in the first heating process 360 by an offset amount. This is to further prevent unintended blue shift. For example, if the blueshift voltage was 2.5 volts, the voltage range applied during the second heating process 380 should be between 0 to 2 volts. In any case, all the voltages applied during the second heating process 380 is lower than the blueshift voltage (highest voltage applied in the first heating process 360).

Heating up the ring resonator 108 causes a red shift, moving the resonance wavelength 412 to a longer final resonance wavelength 420 matching the target wavelength. However, because of the first heating process 360, the amount of red shift needed is significantly reduced (e.g., from close to 1 FSR to less than 1 nm). Therefore, in operation, the voltage range applied in the second heating process 380 can be much lower than the blueshift voltage range. For example, only a red shift voltage range of 0 to 0.5 volts is needed. In other embodiments, the red shift voltage range is between 0 to 1.5 volts. Similarly, if a heat stress is applied, the temperature range for red shift may be between 0 to 150 degrees Celsius at the heater 112. And at the ring resonator 108, the temperature would be even less than that, for example, between 0 to 100 degrees. In other embodiments, the red shift temperature range is between 0 to 350 degrees Celsius at the heater 112. And at the ring resonator 108, the temperature would be even less than that, for example, between 0 to 150 degrees Celsius. In any case, the temperature range for red shift is lower than the temperature range for blue shift.

Since the first heating process 360 lowers the voltage needed in the second heating process 380, the differences between the two voltage ranges become more pronounced. As such, the max voltage applied in the first heating process 360 no longer becomes a limiting factor for the voltages applied in the second heating process 380. For example, in an embodiment where the blueshift voltage is between 2 to 3.5 volts (first heating process 360), the red shift voltage range is between 0 to 0.5 volts (second heating process 380). And in an embodiment where the blueshift temperature is between 500 to 900 degrees Celsius (first heating process 360), which causes the ring resonator 108 and silicon waveguide 106 to have a temperature between 200-400 degrees Celsius, the red shift temperature range is between 0 to 100 degrees Celsius (second heating process 380).

Further, the second heating process 380 differs from the first heating process 360 in the length of time heat is applied. As described above, during the first heating process 360, each time a voltage or heat stress is applied, it may be applied for less than 2 minutes. This is because continuous application of heat stress at blueshift levels may damage the device. Further, continuous heat is not needed as long as intrinsic dielectric properties of the dielectric layer 110 has been changed. This change is realized even after temperature returns to 0 (which is when blue shift is measured). On the other hand, during the second heating process 380, a temperature greater than 0 degrees Celsius on the ring resonator 108 is maintained. As such, the voltage or heat stress may need to be applied continuously to maintain the desired temperature. For example, a voltage is continuously applied, or periodically applied, for the duration of when the device 100 and ring resonator 108 is operating. In an embodiment, a feedback control circuit monitors the temperature to maintain the desired red shift. However, when the temperature returns to 0 (when heater 112 is turned off), the red shift would go away after the heat dissipates and the resonance wavelength 414 returns to the adjusted resonance wavelength 412.

The second heating process 380 is performed during circuit operation of the silicon photonics device 100. For example, in a manufacturing cycle, the operations 310 and 312 (i.e., performing the first heating process 360 and determining a resonance match between a final resonance wavelength and a target wavelength) is performed when the silicon photonics device 100 is actively transmitting optical data. These operations may be carried out before or after a first heating process 360 as described with respect to operation 306.

Still referring to FIG. 6, after the second heating process 380, at operation 312, the method 300 determines a resonance match between the second adjusted resonance wavelength 414 and the target wavelength. As shown, resonance match occurs when the second adjusted resonance wavelength 414 shifts to the final resonance wavelength 420. Since the blue shift from the first heating process 360 only slightly moves the initial resonance wavelength 410 to a wavelength shorter than the target wavelength, only a slight amount of heat is needed to tune the ring resonator 108 in the second heating process 380. As opposed to having to shift a wavelength close to one FSR (if blue shift was not possible), the amount of red shift needed is significantly reduced. In other words, by the inclusion of the first heating process 360, overall power consumption during the operation of the device 100 is reduced.

In another embodiment, the second heating process 380 may be performed without performing the first heating process 360. In these cases, after the method 300 determines a blue shift tuning range at operation 304, the method 300 skips to operation 310 to perform the second heat process. This occurs, for example, when blue shift tuning range is insufficient, or when blue shift tuning range is sufficient but other factors weigh against blue shifting. In these cases, only the second heating process 380 is performed and the device 100 only goes through red shift tuning. As such, the second heating process 380 directly shifts an initial resonance wavelength 410, or another initial resonance wavelength 415 one FSR shorter, to a longer final resonance wavelength 420 to match the target wavelength. In some of these cases, the heat stress or voltage required to tune the ring resonator 108 during operation would be greater than in cases where the first heating process 360 is performed.

Figure 7A:
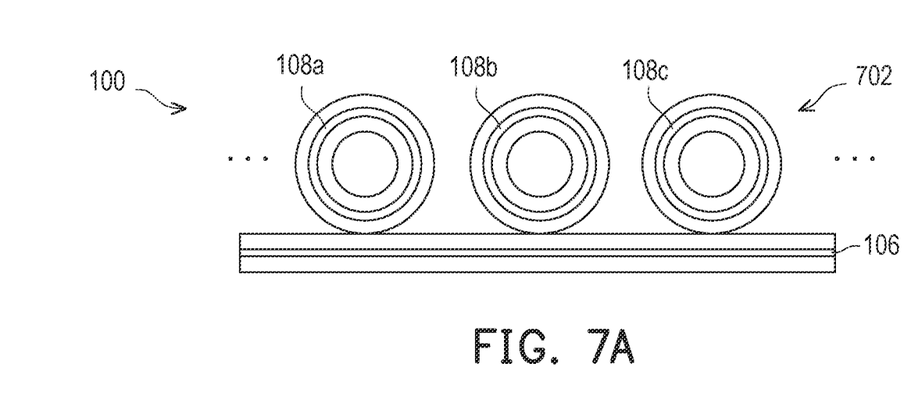
FIG. 7A illustrates a top-down view of a silicon photonics device having a ring resonator array according to an embodiment of the present disclosure.

FIG. 7A illustrates a top-down view of a silicon photonics device 100 having a ring resonator array 702 according to an embodiment of the present disclosure. The ring resonator array 702 includes a plurality of ring resonators, which includes ring resonators 108a, 108b, and 108c. Each of the ring resonators 108a, 108b, and 108c is separately coupled to a waveguide, such as the bus waveguide 106. The waveguide 106 includes an input port and an output port, where optical signals for different channels at different operating wavelengths travel through. When resonance occurs, these optical signals may also travel into and out of the ring resonators 108a, 108b, and 108c. FIG. 7A only shows 3 ring resonators, but the ring resonator array 702 may include more ring resonators, depending on design characteristics.

Figure 7B:
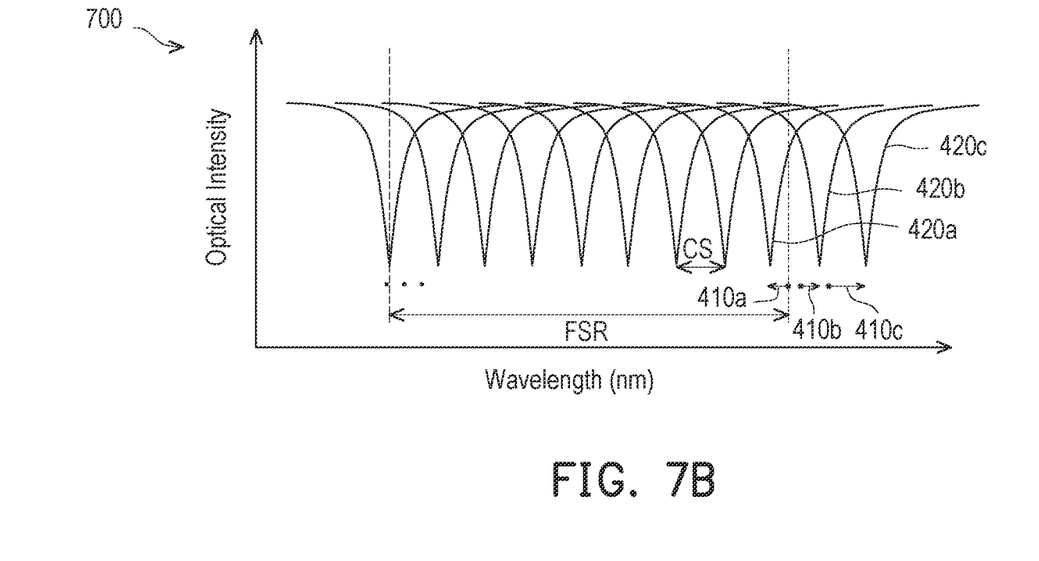
FIG. 7B illustrates a diagram of resonance wavelength tuning with respect to a ring resonator array according to an embodiment of the present disclosure.

FIG. 7B illustrates a diagram 700 of resonance wavelength tuning with respect to the ring resonator array 702 shown in FIG. 7A. The diagram 700 shows a spectral response of the ring resonator array 702. The final resonance wavelengths 420a, 420b, and 420c correspond to the target final resonance wavelengths of the ring resonators 108a, 108b, and 108c, respectively. These final resonance wavelengths match the respective target operating wavelengths, which may correspond to different channels. The initial resonance wavelengths 410a, 410b, and 410c correspond to the resonance wavelengths to be tuned for each ring resonators 108a, 108b, and 108c, respectively. Some initial resonance wavelengths (e.g., wavelengths 410b and 410c) may be shorter than their target final resonance wavelengths. And some initial resonance wavelengths (e.g., wavelength 410a) may be longer than their target final resonance wavelengths. According to the method 300 described above, each of these initial resonance wavelengths may be tuned by the first heating process 360, the second heating process 380, or both. For example, the initial resonance wavelength 410a is tuned by blue shifting by the first heating process 360, and the initial resonance wavelengths 410b and 410c are tuned by red shifting by the second heating process 380.

In some embodiments, the blue shift tuning range, unlike the red shift tuning range, cannot reach a full FSR. As such, resonance tuning must sometimes fall back on red shift to get to the next resonance peak (by the second heating process 380). This would always be the case when blue shift tuning cannot achieve resonance match. However, as described above, these red shifts would require extra heat stress during operation, which is undesirable and defeats the purpose. In FIG. 7B, the diagram 700 demonstrates that with a silicon photonics device 100 having the ring resonator array 702, the option of blue shift would always be available as long as the blue shift tuning range can cover a channel spacing CS. The channel spacing CS refers to the spacing between optical channels having different target operating wavelengths. The channel spacing CS may be designed to be less than 1 nm. This way, blue shift is possible even when the blue shift cannot reach a full FSR, and the silicon photonics device 100 is given greater flexibility for bidirectional wavelength tuning.

The foregoing embodiments illustrate devices and methods to achieve resonance tuning in both the blue shift (to shorter wavelength) and red shift (to longer wavelength) direction. Blue shift is achieved by changing the intrinsic dielectric properties surrounding waveguides and resonators. The present disclosure describes changing the dielectric properties through heat stress or voltage stress (e.g., through a heater), but the present disclosure is not limited thereto. This change in dielectric properties may be introduced by other stress introducers in the form of thermal, electrical, and/or mechanical stress. The stress change alters the effective refractive index of the device, leading to change in performance due to the sensitive nature of silicon photonic devices such as resonators and modulators.

The present disclosure describes ring resonators to tune resonance wavelength, but other silicon photonic devices such as grating couplers, phase shifters, directional couplers, Y-junction, and MMI may also effectuate blue shift tuning through the methods described herein. For example, by applying a high enough voltage stress to heat up a dielectric layer near a grating coupler, the resonant wavelength at 0V will be permanently shifted to a shorter wavelength, as the effective refractive index of the dielectric layers between waveguides and other photonic devises are changed. The blue shift amount is decided by the largest heater voltage applied, and subsequent voltage applied in normal operating range will not cause additional blue shift as long as the subsequent voltage is lower. Varying the heat stress could be programmable and thus will be able to meet various application needs.

Although not intended to be limiting, the present disclosure offers advantages related to wavelength tuning in silicon photonics devices. The capability to shift resonance wavelength in the shorter direction allows for flexibility in resonance tuning. This also reduces the heater power needed to match resonance wavelength with laser wavelength during operation. Further, by having multiple resonators in an array, it is possible to always tune to the desired resonance wavelength through blue shifting, as long as the blue shift tuning range covers at least one channel spacing. Still further, since blue shift allows a reset of resonance wavelength, heater power otherwise necessary for red shifting may be eliminated during operation of the silicon photonics device.

One aspect of the present disclosure pertains to a method of wavelength tuning in a silicon photonics circuit. The method includes receiving a bus waveguide, a ring resonator optically coupled to the bus waveguide, and a dielectric layer over the bus waveguide and over the ring resonator. The method further includes performing a first heat process at a first temperature to heat up the dielectric layer, wherein the first heat process shifts an initial resonance wavelength of the ring resonator to a first resonance wavelength shorter than the initial resonance wavelength. The first heat process permanently shifts the initial resonance wavelength to the first resonance wavelength, the first resonance wavelength being a wavelength when no heat is being applied to the ring resonator.

In an embodiment, the first resonance wavelength is shifted to match an optical wavelength at an input port of the bus waveguide.

In an embodiment, the first heat process includes applying a first set of voltages to a heater over the ring resonator, the heater being separated from the ring resonator by at least a portion of the dielectric layer. In another embodiment, the highest voltage applied in the first set of voltages determines the first resonance wavelength.

In an embodiment, the ring resonator is a first ring resonator, and the method of wavelength tuning further includes receiving a second ring resonator coupled to the bus waveguide, and the first heat process is configured to shift the initial resonance wavelength to cover a wavelength tuning range of at least one channel spacing between the first and second ring resonators.

In an embodiment, the method of wavelength tuning further includes after performing the first heat process, performing a second heat process at a second temperature lower than the first temperature to heat up the ring resonator. The second heat process shifts the first resonance wavelength to a second resonance wavelength longer than the first resonance wavelength. And the second heat process tunes the first resonance wavelength to the second resonance wavelength during circuit operation, the second resonance wavelength being a wavelength when heat is being applied to the ring resonator. In another embodiment, the first resonance wavelength is tuned to a wavelength shorter than an optical wavelength at an input port of the bus waveguide. In another embodiment, the second resonance wavelength is tuned to match an optical wavelength at the input port of the bus waveguide.

In an embodiment, the first heat process includes applying a first set of voltages to a heater over the ring resonator, the heater being separated from the ring resonator by at least a portion of the dielectric layer. The second heat process includes applying a second set of voltages to the heater over the ring resonator, where a highest voltage applied in the second set of voltages is lower than a highest voltage applied in the first set of voltages.

Another aspect of the present disclosure pertains to a method of resonance tuning in a silicon photonics circuit. The method includes receiving a workpiece having a ring resonator, a dielectric layer surrounding the ring resonator, and a heater disposed over the ring resonator. The method further includes applying a first set of voltages to the heater that permanently changes an effective refractive index of the dielectric layer, thereby shifting an initial resonance wavelength of the ring resonator to a first resonance wavelength; and applying a second set of voltages to the heater that temporarily changes the effective refractive index of the dielectric layer, thereby shifting the first resonance wavelength to a second resonance wavelength. A highest voltage applied in the second set of voltages is lower than a highest voltage applied in the first set of voltages.

In an embodiment, the highest voltage applied in the first set of voltages determines the first resonance wavelength. In an embodiment, the first resonance wavelength is shorter than the initial resonance wavelength. In another embodiment, the second resonance wavelength is longer than the first resonance wavelength. In an embodiment, the second set of voltages range from 0 to 2 volts.

Another aspect of the present disclosure pertains to a method of resonance tuning in a silicon photonics circuit. The method includes determining an initial resonance wavelength of a ring resonator surrounded by a dielectric layer, the ring resonator being coupled to an optical waveguide; and applying a first heat stress to the dielectric layer to shift the initial resonance wavelength to an adjusted resonance wavelength. The adjusted resonance wavelength is shorter than an optical wavelength at an input port of the optical waveguide.

In an embodiment, applying the first heat stress includes permanently changing an effective refractive index of the dielectric layer.

In an embodiment, the method of resonance tuning further includes applying a second heat stress to the ring resonator to shift the adjusted resonance wavelength to match the optical wavelength. In another embodiment, the first heat stress comprises a temperature greater than that of the second heat stress. In an embodiment, the first heat stress is applied for less than 2 minutes. In an embodiment, the second heat stress is applied to maintain a temperature greater than 0 degrees Celsius when the ring resonator is operating.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method of wavelength tuning in a silicon photonics circuit, comprising:
   receiving a bus waveguide, a ring resonator optically coupled to the bus waveguide, and a dielectric layer over the bus waveguide and over the ring resonator; and
   performing a first heat process at a first temperature to heat up the dielectric layer, wherein the first heat process shifts an initial resonance wavelength of the ring resonator to a first resonance wavelength shorter than the initial resonance wavelength,
   wherein the first heat process permanently shifts the initial resonance wavelength to the first resonance wavelength, the first resonance wavelength being a wavelength when no heat is being applied to the ring resonator,
   wherein the first heat process includes applying a first set of voltages to a heater over the ring resonator, and a highest voltage applied in the first set of voltages determines the first resonance wavelength.

2. The method of claim 1, wherein the first resonance wavelength is shifted to match an optical wavelength at an input port of the bus waveguide.

3. The method of claim 1, wherein the heater is separated from the ring resonator by at least a portion of the dielectric layer.

4. The method of claim 1, wherein the ring resonator is a first ring resonator, further comprising:
   receiving a second ring resonator coupled to the bus waveguide, wherein the first heat process is configured to shift the initial resonance wavelength to cover a wavelength tuning range of at least one channel spacing between the first and second ring resonators.

5. The method of wavelength tuning in claim 1, further comprising:
   after performing the first heat process, performing a second heat process at a second temperature lower than the first temperature to heat up the ring resonator, wherein the second heat process shifts the first resonance wavelength to a second resonance wavelength longer than the first resonance wavelength,
   wherein the second heat process tunes the first resonance wavelength to the second resonance wavelength during circuit operation, the second resonance wavelength being a wavelength when heat is being applied to the ring resonator.

6. The method of wavelength tuning in claim 5, wherein the first resonance wavelength is tuned to a wavelength shorter than an optical wavelength at an input port of the bus waveguide.

7. The method of wavelength tuning in claim 6, wherein the second resonance wavelength is tuned to match an optical wavelength at the input port of the bus waveguide.

8. The method of claim 5,
wherein the first heat process includes applying a first set of voltages to a heater over the ring resonator, the heater being separated from the ring resonator by at least a portion of the dielectric layer,
wherein the second heat process includes applying a second set of voltages to the heater over the ring resonator,
wherein a highest voltage applied in the second set of voltages is lower than a highest voltage applied in the first set of voltages.

9. The method of claim 1, further comprising:
before performing the first heat process, determining that the first heat process is capable of shifting the initial resonance wavelength in a shorter wavelength direction to match an optical wavelength at an input port of the bus waveguide.

10. A method of resonance tuning in a silicon photonics circuit, comprising:
receiving a workpiece comprising:
a ring resonator;
a dielectric layer surrounding the ring resonator, and
a heater disposed over the ring resonator;
applying a first set of voltages to the heater that permanently changes an effective refractive index of the dielectric layer, thereby shifting an initial resonance wavelength of the ring resonator to a first resonance wavelength; and
applying a second set of voltages to the heater that temporarily changes the effective refractive index of the dielectric layer, thereby shifting the first resonance wavelength to a second resonance wavelength,
wherein a highest voltage applied in the second set of voltages is lower than a highest voltage applied in the first set of voltages.

11. The method of claim 10, wherein the highest voltage applied in the first set of voltages determines the first resonance wavelength.

12. The method of claim 10, wherein the first resonance wavelength is shorter than the initial resonance wavelength.

13. The method of claim 12, wherein the second resonance wavelength is longer than the first resonance wavelength.

14. The method of claim 10, wherein the second set of voltages range from 0 to 2 volts.

15. A method of resonance tuning in a silicon photonics circuit, comprising:
determining an initial resonance wavelength of a ring resonator surrounded by a dielectric layer, the ring resonator being coupled to an optical waveguide;
applying a first heat stress to the dielectric layer to shift the initial resonance wavelength to an adjusted resonance wavelength, wherein the adjusted resonance wavelength is shorter than an optical wavelength at an input port of the optical waveguide; and
applying a second heat stress to the ring resonator to shift the adjusted resonance wavelength to match the optical wavelength, wherein the first heat stress comprises a temperature greater than that of the second heat stress.

16. The method of claim 15, wherein applying the first heat stress includes permanently changing an effective refractive index of the dielectric layer.

17. The method of claim 15, wherein the first heat stress is applied for less than 2 minutes.

18. The method of claim 17, wherein the second heat stress is applied to maintain a temperature greater than 0 degrees Celsius when the ring resonator is operating.

19. The method of claim 15, wherein the first heat stress is applied before operation of the optical waveguide, and the second heat stress is applied during the operation of the optical waveguide.

20. The method of claim 15, wherein the first heat stress and the second heat stress are generated by different heaters.

* * * * *